United States Patent
Narita

(10) Patent No.: US 6,937,661 B2
(45) Date of Patent: Aug. 30, 2005

(54) VIDEO ENCODER AND/OR DECODER

(75) Inventor: Hideyuki Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 124 days.

(21) Appl. No.: 10/620,626

(22) Filed: Jul. 16, 2003

(65) Prior Publication Data

US 2004/0013193 A1 Jan. 22, 2004

(30) Foreign Application Priority Data

Jul. 18, 2002 (JP) .................................. P2002-210166

(51) Int. Cl.$^7$ ............................................. H04N 7/12
(52) U.S. Cl. ............ 375/240.26; 375/240; 375/240.01; 375/240.24
(58) Field of Search ....................... 375/240.26, 240, 375/240.01, 240.12, 240.24, 240.25, 240.27; 348/180

(56) References Cited

U.S. PATENT DOCUMENTS 5,051,827 A * 9/1991 Fairhurst .................... 348/180
5,771,081 A * 6/1998 Lee ........................ 375/240.27

* cited by examiner

Primary Examiner—Allen Wong
(74) Attorney, Agent, or Firm—Frommer Lawrence & Haug LLP; William S. Frommer

(57) ABSTRACT

A video codec (1) is provided in which a frame sync (FS) in base-band video data is delayed a predetermined time. A processor (14) is provided to make interrupt in a timing that is based on the delayed frame sync and make settings for input/output processing with respect to input/output modules (11 and 13). The processor (14) makes interrupt in a timing which is based on any of the delayed frame sync, video clock (V. Clk) and system clock (Sys. Clk) to control encoding or decoding start timing of a codec module (12). Thus, base-band video data can be encoded and decoded in a steady input/output timing.

6 Claims, 4 Drawing Sheets

VIDEO ENCODER AND/OR DECODER

BACKGROUND OF THE INVENTION

1. Field of the Invention

The present invention generally relates to the field of video encoding and/or decoding, and more particularly to a video encoder and/or decoder for encoding video data into data complying with a predetermined encoding standard and decoding data complying with the predetermined standard into video data, and to a method of controlling the operation timing of a video encoder and/or decoder.

This application claims the priority of the Japanese Patent Application No. 2002-210166 filed on Jul. 18, 2002, the entirety of which is incorporated by reference herein.

2. Background Discussion

The video codec (coder/decoder, namely provided with both encoding and decoding functions) supporting MPEG-2 (ISO/IEC 13818-2), MPEG-4 (ISO/IEC 14496-2) or the like is well known.

FIGS. 1 to 3 show first to third conventional video codecs, respectively; FIG. 1 schematically shows the construction of the first conventional video codec (generally indicated with a reference 101), FIG. 2 shows the construction of the second conventional video codec (generally indicated with a reference 102), and FIG. 3 shows the construction of the third conventional video codec (generally indicated with a reference 103).

As shown, each of the first to third conventional video codecs 101 to 103 includes a video input module 111, codec module 112 and a video output module 113 as main components.

When in the encoding mode of operation, each of the first to third conventional video codecs 101 to 103 is supplied with external baseband video data. When in the mode of decoding, it is supplied with external coded data.

The video input module 111 is used when the video codec is in the coding mode. It is supplied with baseband video data from outside. It stores the external video data into a memory and makes input processing of the video data, both in units of a frame. The baseband video data thus processed in the video input module 111 is supplied to the codec module 112.

When the video codec is in the encoding, the codec module 112 is supplied with baseband video data from the video input module 111 as above. On the other hand, when the video codec is in the decoding mode, the codec module 112 is supplied with external coded data. When the video codec is in the encoding mode, the codec module 112 encodes the input baseband video data to provide coded data. On the other hand, when the video codec is in the decoding mode, the codec module 112 will decode the supplied external coded data to provide baseband video data.

When the video codec is in the decoding mode, the video output module 113 is put into operation. It is supplied with baseband video data from the codec module 112, and stores the input base-band video data and makes output processing of the video data, both frame by frame. The base-band vide data thus processed in the video output module 113 is delivered to outside.

When the video codec is in the encoding mode, each of the aforementioned first to third conventional video codecs 101 to 103 delivers coded data generated by the codec module 112 to outside. When the video codec is in the decoding mode, it delivers baseband video data processed in the video output module 113 to outside.

In the first conventional video codec 101, an external frame sync (FS) is supplied to the video input module 111, codec module 112 and video output module 113. The external frame sync is a signal indicative of a sync timing of frame (or field) of base-band video data the video codec. Upon reception of the external frame sync as a start pulse, the modules 111 to 113 in the first conventional video codec 101 will start input processing and output processing and encoding and decoding, respectively, both in units of a frame.

Therefore, the first conventional video codec 101 can make the frame input/output processing synchronously with the external frame sync and the frame encoding/decoding synchronously with the external frame sync.

In the second conventional video codec 102, the video input and output modules 111 and 113 are supplied with an external frame sync. Upon reception of the external frame sync as a start pulse, each of the video input and output modules 111 and 113 in the second conventional video codec 102 start input processing and output processing, respectively, in units of a frame. Further, the second conventional video codec 102 has provided therein a processor 114 which controls the timing of encode and decode start of the codec module 112 and sets the video input and output modules 111 and 113. The processor 114 accepts the external frame sync as an interrupt signal, and supplies a encode/decode start signal to the codec module 112 according to the timing in which it has accepted the external frame sync. Upon acceptance of the encode/decode start signal, the codec module 112 starts data encoding or decoding for one frame. Also, upon acceptance of the external frame sync, the processor 114 sets a parameter or the like necessary for the frame input processing and output processing in the video input and output modules 111 and 113, respectively, at a time in which it has accepted the external frame sync. For example, the processor 114 will set a storage location for an input or output frame by setting a memory address or the like in the video input and output modules 111 and 113.

The aforementioned second conventional video codec 102 can make input/output processing of a frame synchronously with the external frame sync and frame encoding and decoding synchronously with the external frame sync. Also, the second conventional video codec 102 can easily make adjustment of encoding and decoding timing such as suspension of the encoding and decoding because the processor 114 controls the timing of encoding and decoding. Therefore, the second conventional video codec 102 can easily thin frames, for example.

In the third conventional video codec 103, the video input and output modules 111 and 113 are supplied with an external frame sync. Upon reception of the external frame sync as a start pulse, each of the video input and output modules 111 and 113 in the third conventional video codec 103 start input processing and output processing, respectively, in units of a frame. Further, the third conventional video codec 103 has provide therein a processor 114 which controls the encode and decode start of the codec module 112. The processor 114 accepts a reference signal not synchronous with the external frame sync (a timing signal generated on the basis of a clock signal in baseband video data or timing signal generated on the basis of a system clock signal for the video codec 103, for example) as an interrupt signal, and supplies a encode/decode start signal to the codec module 112 according to the time in which it has accepted the reference signal. Upon acceptance of the encode/decode start signal, the codec module 112 starts data encoding or decoding for one frame.

The aforementioned third conventional video codec 103 can make input/output processing of a frame synchronously with the external frame sync. Also the third conventional video codes 103 can make encoding and decoding asynchronously with the external frame sync because the processor 114 controls the timing of encoding and decoding according to the reference signal not synchronous with the external frame sync. Further, the third conventional video codec 103 can generate a start pulse for the video input and output modules 111 and 113 on the basis of the reference signal, so it can encode and decode data even when no external frame sync is available.

In the first conventional video codec 101, however, it is difficult to adjust the timing of encoding and decoding for synchronization with other signal (audio signal, for example). For example, in the first conventional video codec 101, it is difficult to suspend decoding for only one frame. On the other hand, the second conventional video codec 102 can easily adjust the encoding and decoding timing because the processor 114 controls the timing of encoding and decoding. In the second conventional video codec 102, however, increase or decrease of data throughput in the processor 114 will cause a jitter in timing of setting the video input and output modules 111 and 113. In such a case, the video input and output modules 111 and 113 will be set at a time before or after the external frame sync, which will cause base-band video data to be input/output-processed with an unsteady timing.

Also, in the second conventional video codec 102, it is difficult to encode and decode data on the basis of a reference signal not synchronous with the external frame sync, and also the encoding and decoding themselves are difficult when no external frame sync is supplied. On the other hand, the third conventional video codec 103 can encode and decode data on the basis of a reference signal not synchronous with the external frame sync and also even when no external frame signal is supplied. However, the third conventional video codec 103 cannot encode and decode data synchronously or asynchronously with the external frame sync.

OBJECT AND SUMMARY OF THE INVENTION

It is therefore an object of the present invention to overcome the above-mentioned drawbacks of the related art by providing a video encoder and/or decoder, and a video encoder and/or decoder operation control method, in which encoding or decoding timing can easily be controlled and baseband video data is input/output-processed in a stable timing.

It is another object of the present invention to provide a video encoder and/or decoder, and a video encoder and/or decoder operation control method, in which encoding and decoding synchronous with an external frame sync and encoding and decoding not synchronous with an external frame sync can easily be switched between them without changing the hardware construction.

The above object can be attained by providing a video encoder and/or decoder, and a video encoder and/or decoder operation control method, in which a video sync signal synchronous with each image included in input/output video data is delayed a determined time and setting is done for making input/output processing of each image included in the video data in a timing that is based on the delayed video sync signal. By delaying the setting for the input/output processing the predetermined time from the video sync signal, the setting for the input/output processing can be made at a time when video sync signals have a fixed phase lag from one to another.

Also the above object can be attained by providing a video encoder and/or decoder, and a video encoder and/or decoder operation control method, in which any one of a first timing signal generated based on a sync clock in video data, a second timing signal generated based on a system clock not synchronous with the video data and a delayed video sync signal is selected and encoding or decoding is started in a timing that is based on the selected signal.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

A codec (coder/decoder) for video data compressed according to MPEG-2, MPEG-4 or a similar standard will be described as an embodiment of the present invention.

Figure 1:
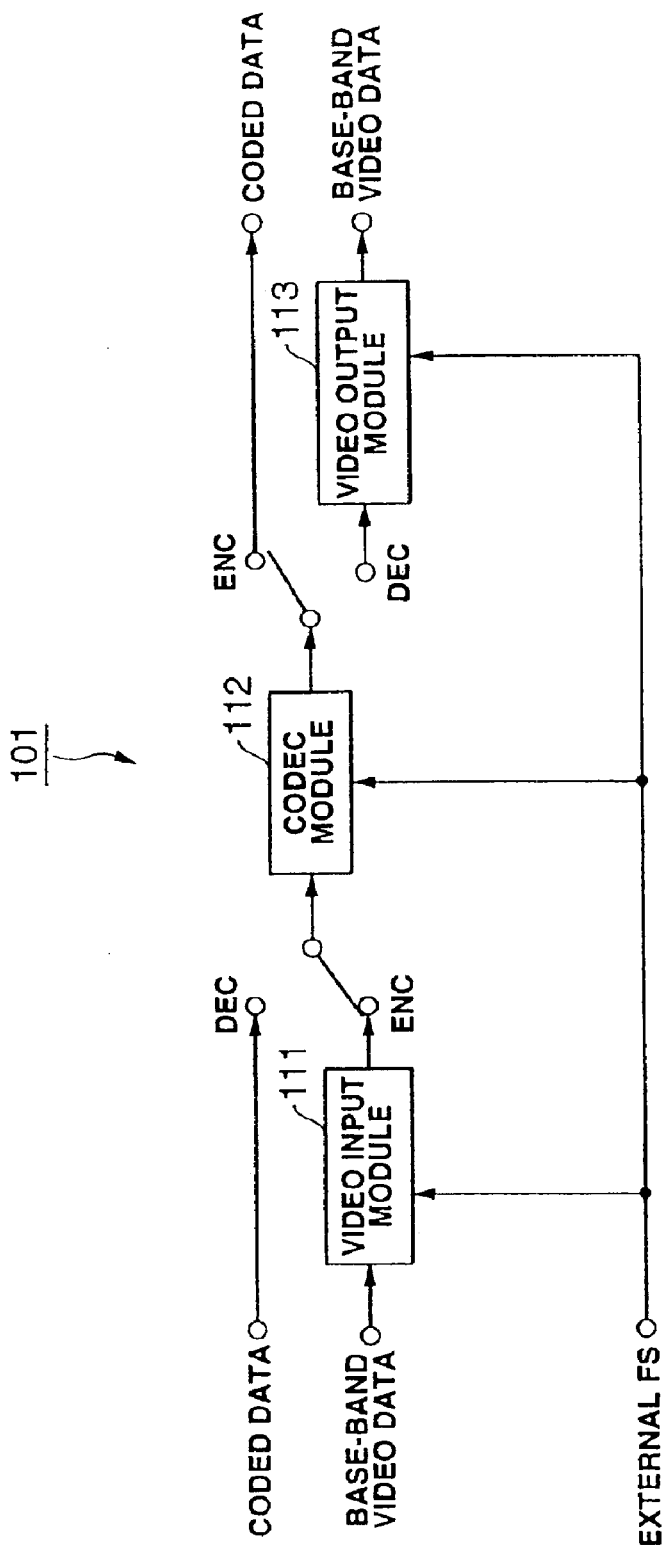
FIG. 1 is a block diagram of a first conventional video codec.
Figure 2:
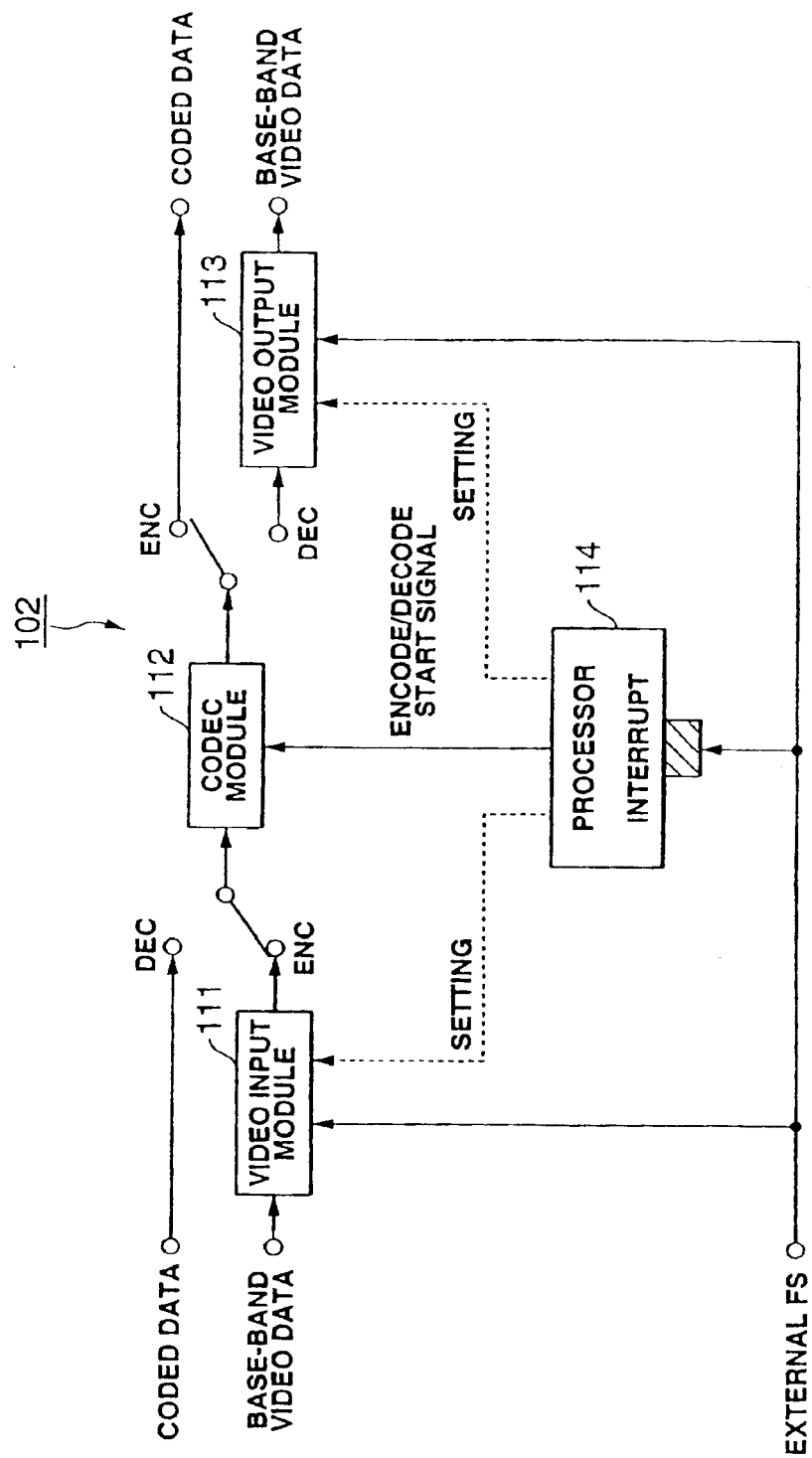
FIG. 2 is a block diagram of a second conventional video codec.
Figure 3:
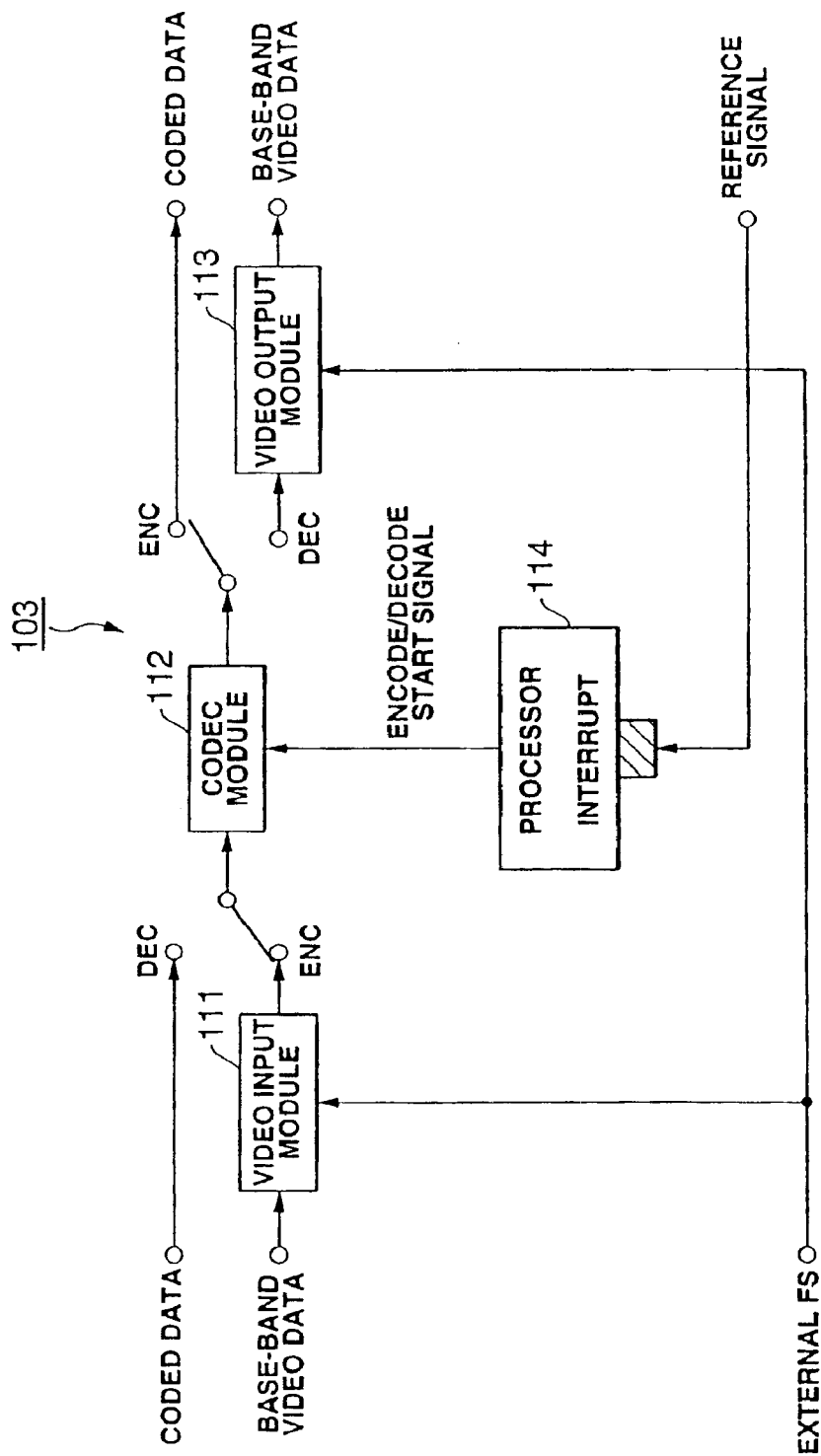
FIG. 3 is a block diagram of a third conventional video codec.
Figure 4:
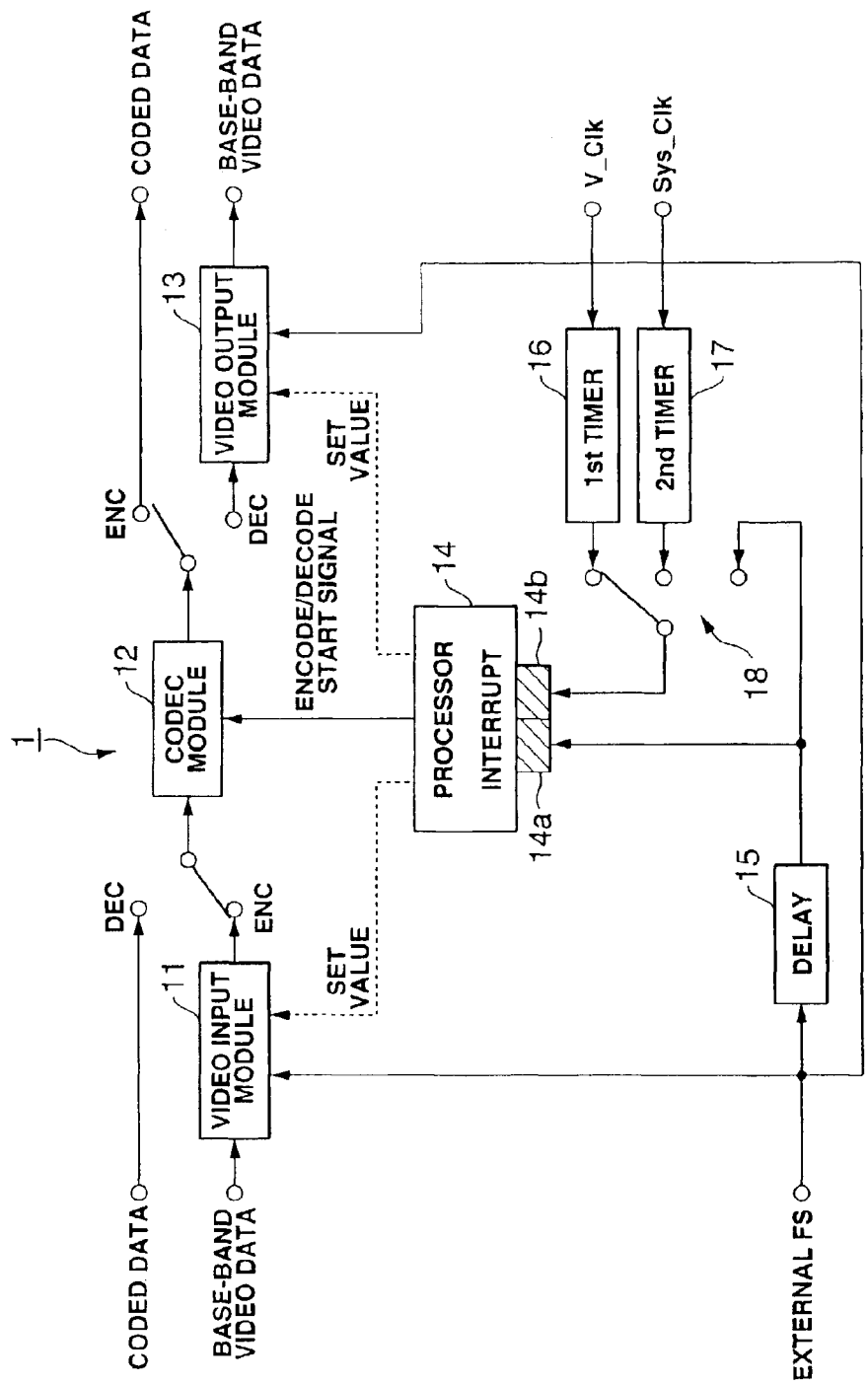
FIG. 4 is a block diagram of the video codec according to the present invention.

Referring now to FIG. 4, a video codec according to the present invention is schematically illustrated in the form of a block diagram. The video codec is generally indicated with a reference 1.

As shown, the video codec 1 according to the present invention includes a video input module 11, codec module 12 and a video output module 13. Also, the video codec 1 includes a processor 14, delay circuit 15, first timer circuit 16, second timer switch 17 and a select switch 18.

When in the encoding mode, the video codec 1 is supplied with base-band video data from outside. When in the decoding mode, the video coded is supplied with coded data from outside.

The video input module 11 is used when the video codec 1 is in the encoding mode. The video input module 11 is supplied with external base-band video data, and stores the data into a memory, makes input processing of the data, etc. all in units of a frame. The base-band video data processed in the video input module 11 is supplied to the codec module 12. Also, the video input module 11 is supplied with an external frame sync. The video input module 11 makes input processing of the input base-band video data frame by frame with a timing indicated by the external frame sync.

When the video codec 1 is in the encoding mode, the codec module 12 is supplied with base-band video data from the video input module 11. On other hand, when the video codec 1 is in the decoding mode, it is supplied with coded data from outside. When in the encoding mode, the codec module 12 encodes input base-band video data to provide coded data. When in the decoding mode, the codec module 12 decodes input coded data to provide base-band video data.

The video output module 13 is used when the video codec 1 is in the decoding mode. The video output module 13 is supplied with base-band video data from the codec module 12, and stores the base-band video data into a memory and makes output processing and other processing of the video data, both in units of a frame. The base-band video data processed by the video output module 13 is provided to outside. Also, the video output module 13 is supplied with an external frame sync. The video output module 13 will make output processing of the base-band video data with a timing indicated by the external frame sync.

When in the encoding mode, the video codec 1 constructed as above will provide the coded data generated by the codec module 12 to outside. When in the decoding mode, the video codec 1 delivers the base-band video data processed in the video output module 13 to outside.

The processor 14 controls the timing of encode and decode start of the codec module 12 and setting of the video input and output modules 11 and 13. The processor 14 is provided with a first interrupt terminal 14a and second interrupt terminal 14b.

When supplied at the first interrupt terminal 14a with an interrupt signal, the processor 14 starts a program under which setting is made for a frame supplied to the video input module 11 or delivered from the video output module 13. When the program is started, a set value for a frame supplied to the video input module 11 or delivered from the video output module 13. That is to say, the processor 14 controls the input/output setting for each frame included in base-band video data. For example, the processor 14 sets a memory address in the video input and output modules 11 and 13 and secures a storage location for one input/output frame.

When supplied at the second interrupt terminal 14b with an interrupt signal, the processor 14 starts a program under which an encode/decode start signal is supplied to the codec module 12. When the program is started, the codec module 12 is supplied with an encode or decode start signal for the frame. That is, the processor 14 controls the timing of encode and decode start for each frame.

The delay circuit 15 is supplied with an external frame sync, and delays the external frame sync a predetermined time. The amount of delay by the delay circuit 15 is set for external frame sync signals to have a fixed phase lag from one to another, namely, such that the delayed external frame sync will not be in phase with any not-delayed external frame sync. The amount of delay is set by the processor 14. The delayed external frame sync is supplied to the processor 14 at the first interrupt terminal 14a thereof.

The first timer circuit 16 is supplied with a video clock (V. Clk). The video clock is directed for base-band video data supplied to the video input module 11 or delivered from the video output module 13. The first timer circuit 16 cyclically counts video clocks to generate a pulse each time a fixed count is reached. The time interval from one pulse generation to another in the first timer circuit 16 is set by the processor 14 correspondingly to the frame encoding and decoding interval in the codec module 12.

The second timer circuit 17 is supplied with a system clock (Sys. Clk). The system clock is an operation clock of the video codec 1. The second timer circuit 17 cyclically counts system clocks to generate a pulse each time a fixed count is reached. The time interval from one pulse generation to another in the second timer circuit 17 is set by the processor 14 correspondingly to the frame encoding and decoding interval in the codec module 12.

The select switch 18 is supplied with a pulse delivered from the first timer circuit 16, a pulse generated by the second timer circuit 17 and a delayed external frame sync delivered from the delay circuit 15. The select switch 18 selects any one of the three input signals under the control of the processor 14 and supplies it to the second interrupt terminal 14b of the processor 14.

In the video codec 1 constructed as above, an external frame sync (FS) is supplied to the video input and output modules 11 and 13. The external frame sync indicates a synchronization timing of frames (or fields) in base-band video data supplied to or delivered from the video codec 1. The video input and output modules 11 and 13 in the video codec 1 make input processing and output processing, respectively, of the external frame sync as a start pulse in units of a frame. Thus, in the video codec 1, frame input/output processing can be done synchronously with an external frame sync.

Also, in the video codec 1 according to the present invention, the processor 14 is supplied at the first interrupt terminal 14a thereof with the delayed external frame sync. That is to say, the setting for a frame supplied to the video input module 11 or delivered from the video output module 13 will be delayed a fixed time from the time in which the external frame sync has been generated.

More specifically, the video input and output modules 11 and 13 make input processing and output processing, respectively, of video data with an external frame sync being taken as a start signal. On the other hand, the setting of a parameter or the like for the input processing and output processing is started at a time a predetermined phase staggered from an external frame sync. Therefore, even if a jitter takes place in the timing of setting the video input and output modules II and 13 due to an increase or decrease in amount of data processing in the processor 14, for example, the margin due to a delay time will prevent the timing of such setting from being temporally before or after the external frame sync. That is, base-band video data can be input/output-processed with steady timing.

Also, in the video codec 1 according to the present invention, the processor 14 can be supplied at the second interrupt terminal 14b thereof with an interrupt signal in a timing of any one of a pulse having a predetermined duration (coming from the first timer circuit 16) and generated based on the video clock, a pulse having a predetermined duration (coming from the second timer circuit 17) and generated based on the system clock, and the delayed external frame sync.

The processor 14 controls the encoding and decoding timing with the timing of the interrupt signal supplied to the second interrupt terminal 14b thereof. Thus, in the video codec 1 according to the present invention, it is possible to easily make an adjustment of the encoding and decoding timing such as suspension of the encoding and decoding or the like. Therefore, frames can easily be thinned, for example.

Also, neither the pulse having the predetermined duration and generated based on the video clock nor that having the predetermined duration and generated based on the system clock is synchronous with the external frame sync. Thus, the video codec 1 can encode and decode data with a desired one of timing synchronous with the external frame sync and timing not synchronous with the external frame. Therefore, the video codec 1 according to the present invention can freely adjust the encoding and decoding timing to either a timing synchronous with the external frame sync or a timing not synchronous with the external frame sync and thus can easily change the frame rate.

Also, in case no external frame sync is supplied to the video codec 1, a pulse from the first or second timer circuit 16 or 17 may be supplied to the video input and output modules 11 and 13 instead of the external frame sync. Thus, even when no external frame sync is supplied, the video codec 1 can make encoding and decoding.

In the foregoing, the present invention has been described in detail concerning a certain preferred embodiment thereof as an example with reference to the accompanying drawings. However, it should be understood by those ordinarily skilled in the art that the present invention is not limited to the embodiment but can be modified in various manners, constructed alternatively or embodied in various other forms without departing from the scope and spirit thereof as set forth and defined in the appended claims.

The video codec having both the encoding and decoding functions has been described as an embodiment of the present invention. However, the present invention is applicable to an encoder which makes only data encoding and, also to a decoder which makes only data decoding, for example.

Also, the embodiment of the video codec according to the present invention has been illustrated and explained which makes input/output processing, and encoding/decoding, of base-band video data. However, the present invention may be applied to a video codec which makes input/output processing, and encoding/decoding, of base-band video data in units of a field included in an interlaced image. In this case, an external frame sync will be generated in units of a field.

In a video encoder and/or decoder, and a video encoder and/or decoder operation control method, according to the present invention, a video sync signal synchronous with each image included in input/output video data is delayed a determined time and setting is done for making input/output processing of each image included in the video data in a timing that is based on the delayed video sync signal.

According to the present invention, the setting for the input/output processing the predetermined time is delayed from the video sync signal, and so the setting for the input/output processing can be made at a time staggered more than a fixed phase from the video sync signal. Therefore, according to the present invention, it is possible to easily adjust the encoding or decoding timing and stabilize the timing of input/output processing of base-band video data.

Also, in the video encoder and/or decoder, and the video encoder and/or decoder operation control method, according to the present invention, any one of a first timing signal generated based on a sync clock in video data, a second timing signal generated based on a system clock not synchronous with the video data and a delayed video sync signal is selected and encoding or decoding is started in a timing that is based on the selected signal.

Therefore, according to the present invention, encoding/decoding synchronous with an external frame sync and encoding/decoding not synchronous with an external frame sync can easily be switched between them without changing the hardware construction.

What is claimed is:

1. A video encoder and/or decoder, comprising:
    an encoding/decoding means for encoding video data into data complying with a predetermined encoding standard, decoding data complying with the predetermined standard into video data or encoding and encoding data;
    a video input/output means for making input processing video data supplied from outside, output processing of the input-processed video data delivered from the encoding/decoding means and delivering the output-processed video data to outside or making data input and output processing;
    a control means for supplying a start signal indicative of encoding or decoding start timing to the encoding/decoding means while supplying setting information for input/output processing each image included in the video data to the video input/output means;
    a delaying means supplied with an external video sync signal synchronous with each image included in the video data supplied to or delivered from the video input/output means and for delaying the input video sync signal a predetermined time;
    wherein the control means generates the setting information in a timing that is based on the delayed video sync signal delivered from the delaying means and supplying it to the video input/output means;
    a first timing generating means supplied with a video sync clock synchronous with the video data supplied to or delivered from the video input/output means to generate a first timing signal having a first duration;
    a second timing generating means supplied with a system clock not synchronous with the video data to generate a second timing signal having a second duration on the basis of the system clock; and
    a selecting means supplied with the first timing signal, second timing signal and the delayed video sync signal delivered from the delaying means to select any one of these signals and supply it to the control means;
    wherein the control means generates the start signal on the basis of a signal output from the selecting means and supplying it to the encoding/decoding means.

2. The apparatus as set forth in claim 1, wherein the control means generates the start signal in a timing that is based on the delayed video sync signal delivered from the delaying means and supplying it to the encoding/decoding means.

3. The apparatus as set forth in claim 1, wherein the control means is supplied with a reference signal having a predetermined duration from outside, and generates the start signal in a time that is based on the reference signal and supplies it to the encoding/decoding means.

4. A method of controlling the operation timing of a video encoder and decoder including:
    an encoding/decoding module for encoding video data into data complying with a predetermined encoding standard, decoding data complying with the predetermined standard into video data or encoding and decoding data;
    a video input/output module for making input processing video data supplied from outside, output processing of the input-processed video data delivered from the encoding/decoding means and delivering the output-processed video data to outside or making input/output processing;
    the method comprising the steps of:
    delaying a video sync signal synchronous with each image included in the video data supplied to or delivered from the video input/output module a predetermined time;
    generating setting information for the input/output processing of each image included in the video data in a timing that is based on the delayed video sync signal and supplying it to the video input/output module;

generating a first timing signal having a first duration on the basis of a video sync signal synchronous with the video data supplied to or delivered from the video input/output module;

generating a second timing signal having a second duration on the basis of a system clock not synchronous with the video data; and selecting any one of the first timing signal, second timing signal and the delayed video sync signal, generating a start signal indicative of encoding or decoding start timing on the basis of the selected signal and supplying it to the encoding/decoding module.

5. The method as set forth in claim 4, wherein a start signal indicative of encoding or decoding start timing is generated in a timing that and supplied to the encoding/decoding module.

6. The method as set forth in claim 4, wherein a reference signal having a predetermined duration is supplied from outside, and a start signal indicative of encoding or decoding start timing is generated based on the reference signal and supplied to the encoding/decoding module.

* * * * *